United States Patent
Horton, Sr.

(10) Patent No.: US 12,226,053 B1
(45) Date of Patent: Feb. 18, 2025

(54) GRINDER AND EXTRACTION DEVICE

(71) Applicant: Cory A. Horton, Sr., Benicia, CA (US)

(72) Inventor: Cory A. Horton, Sr., Benicia, CA (US)

(*) Notice: Subject to any disclaimer, the term of this patent is extended or adjusted under 35 U.S.C. 154(b) by 0 days.

(21) Appl. No.: 17/959,185

(22) Filed: Oct. 3, 2022

Related U.S. Application Data

(60) Provisional application No. 63/251,440, filed on Oct. 1, 2021.

(51) Int. Cl.
*A47J 42/26* (2006.01)
*A47J 42/30* (2006.01)

(52) U.S. Cl.
CPC ............. *A47J 42/26* (2013.01); *A47J 42/30* (2013.01)

(58) Field of Classification Search
CPC .................. A47J 42/26; A47J 42/30
See application file for complete search history.

(56) References Cited

U.S. PATENT DOCUMENTS

| | | | |
|---|---|---|---|
| 10,799,071 B2 | 10/2020 | Pamplin | |
| 2010/0301806 A1* | 12/2010 | Ormaza | A47J 42/26 320/115 |
| 2018/0229243 A1* | 8/2018 | Nocine | A47J 42/30 |

OTHER PUBLICATIONS

Mamba V2 1g Smoky Electric Portable Herb Grinder. https://www.amazon.com/dp/B099DZFGQ1?maas=maas_adg_23B4C48AF562D6C73AC5CA6C9300D2FC_afap_abs&ref_=aa_maas&tag=maas&ref=myi_title_dp&th=1.*

* cited by examiner

*Primary Examiner* — Mohammed S. Alawadi
(74) *Attorney, Agent, or Firm* — Polsinelli PC

(57) ABSTRACT

In accordance with one embodiment of the present disclosure, a grinding and extraction device includes: a housing including a motor chamber, a grinding chamber, a collection chamber, and an extraction chamber; a motor disposed within the motor chamber; a blade for grinding powered by the motor; a first filter separating the grinding chamber from the collection chamber, wherein the blade is disposed within the grinding chamber within 0.5 inches of the first filter; and a second filter separating the collection chamber and the extraction chamber.

15 Claims, 5 Drawing Sheets

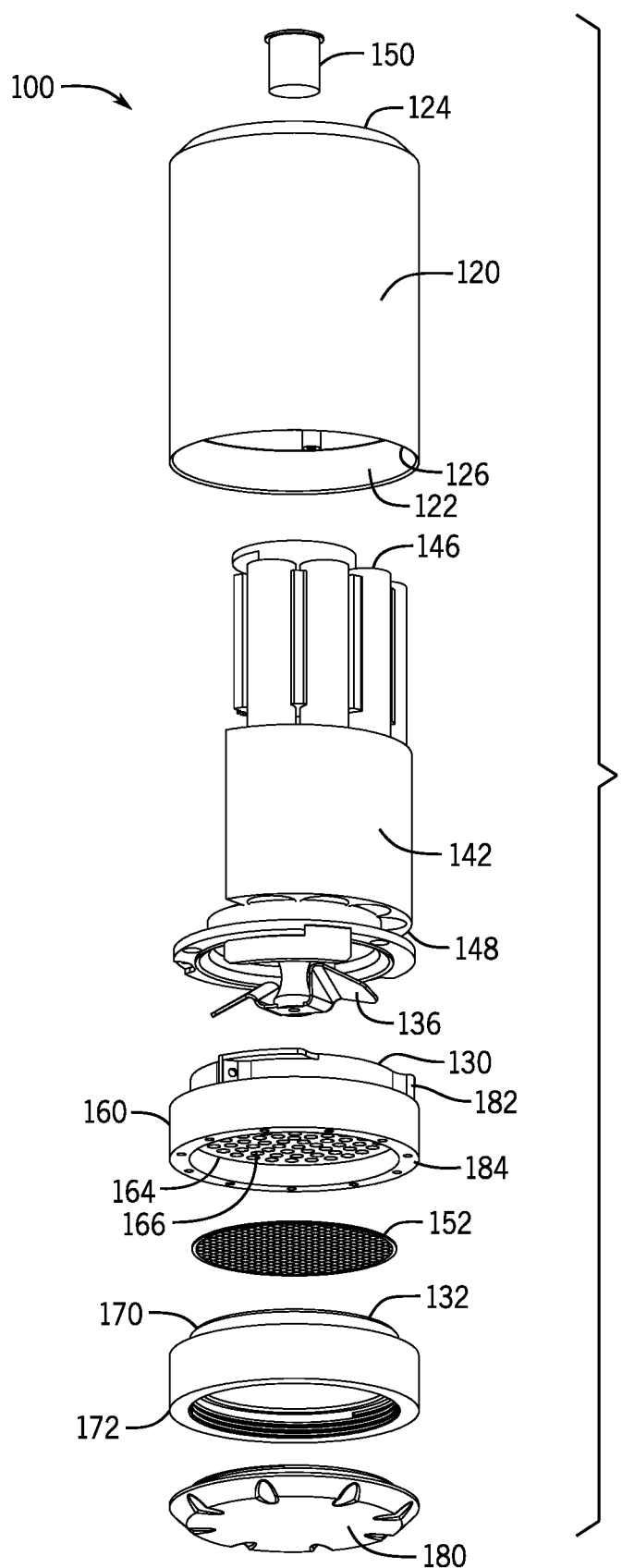

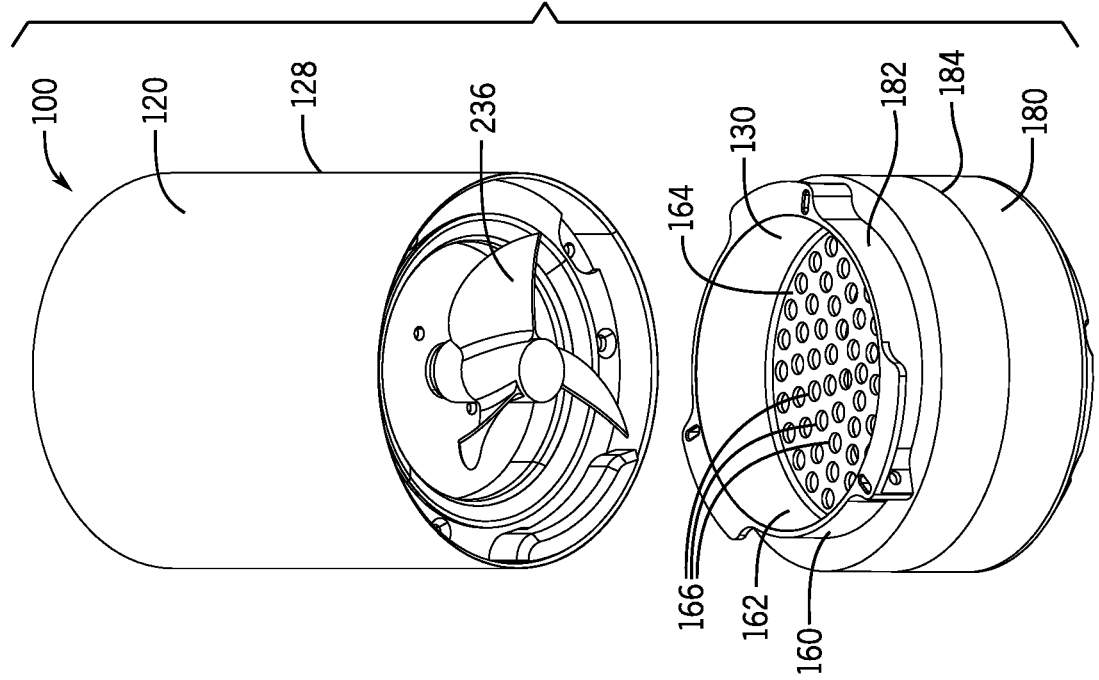

GRINDER AND EXTRACTION DEVICE

CROSS-REFERENCE TO RELATED APPLICATION

This application claims the benefit of U.S. Provisional Application No. 63/251,440, filed Oct. 1, 2021, the disclosure of which is hereby expressly incorporated by reference herein in its entirety.

BACKGROUND

Herbal substances, such as cannabis can be used for medicinal and recreational use. In some instances, a user can use a portion of the cannabis plant (e.g., the flower, known as "bud"). In some of these instances, it may be desirable to grind the cannabis substance before use. Achieving the desired grind, however, can be difficult. Furthermore, grinding process can be a messy and irritating process for some users.

SUMMARY

Embodiments of the present disclosure are directed to grinder and extraction devices for natural substances. In accordance with one embodiment of the present disclosure, a grinding and extraction device is provided. The grinding and extraction device includes: a housing including a motor chamber, a grinding chamber, a collection chamber, and an extraction chamber; a motor disposed within the motor chamber; a blade for grinding powered by the motor; a first filter separating the grinding chamber from the collection chamber, wherein the blade is disposed within the grinding chamber within 0.5 inches of the first filter; and a second filter separating the collection chamber and the extraction chamber.

In accordance with another embodiment of the present disclosure, a grinding and extraction device is provided. The grinding and extraction device includes: a housing including a motor chamber, a grinding chamber, a collection chamber, and an extraction chamber; a motor disposed within the motor chamber; a blade for grinding powered by the motor, wherein the blade is a propeller blade; a first filter separating the grinding chamber from the collection chamber, wherein the blade is disposed within the grinding chamber within 0.5 inches of the first filter; and a second filter separating the collection chamber and the extraction chamber.

In accordance with another embodiment of the present disclosure, a method of grinding and extracting resins from a natural substance is provided. The method includes: obtaining a device having a housing including a grinding chamber, a collection chamber, and an extraction chamber, a first filter separating the grinding chamber from the collection chamber, wherein a blade is disposed within the grinding chamber within 0.5 inches of the first filter, and a second filter separating the collection chamber and the extraction chamber; grinding a natural substance in the grinding chamber; filtering the ground substance having a predetermined particle size into the collection chamber; and filtering a resin substance having a predetermined particle size into the extraction chamber.

In any of the embodiment described herein, the motor may be battery powered.

In any of the embodiment described herein, the motor may be a high-torque motor.

In any of the embodiment described herein, the blade may be selected from the group consisting of flat blades, knife blades, curved knife blades, and propeller blades.

In any of the embodiment described herein, the first filter may have a hole size in the range of about 5 to about 6 mm.

In any of the embodiment described herein, the second filter may have a hole size in the range of about 2 to about 3 mm.

In any of the embodiment described herein, the blade may be disposed within the grinding chamber within 0.25 inches of the first filter.

In any of the embodiment described herein, the device may further include batteries and the batteries may be rechargeable.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3 and 4 depict top and bottom isometric exploded views of the grinder and extraction device of FIGS. 1 and 2.

FIG. 7 depicts an isometric view showing the opening of the grinding chamber of the grinder and extraction device in accordance with one embodiment of the present disclosure of FIGS. 1 and 2, including an alternate blade.

DETAILED DESCRIPTION

Figure 1:
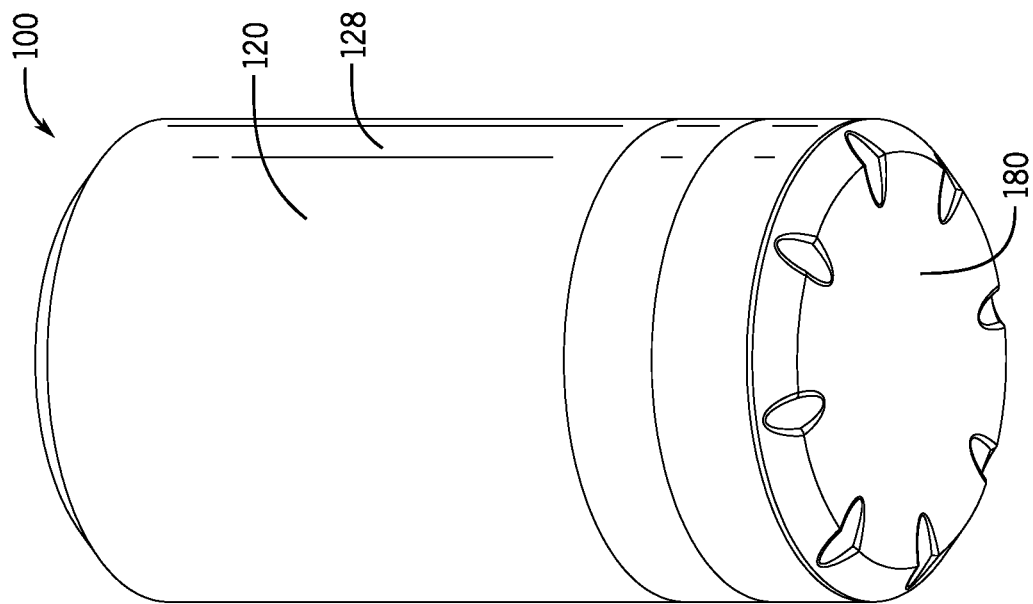
FIG. 1 depicts a top isometric view of a grinder and extraction device in accordance with one embodiment of the present disclosure.
Figure 2:
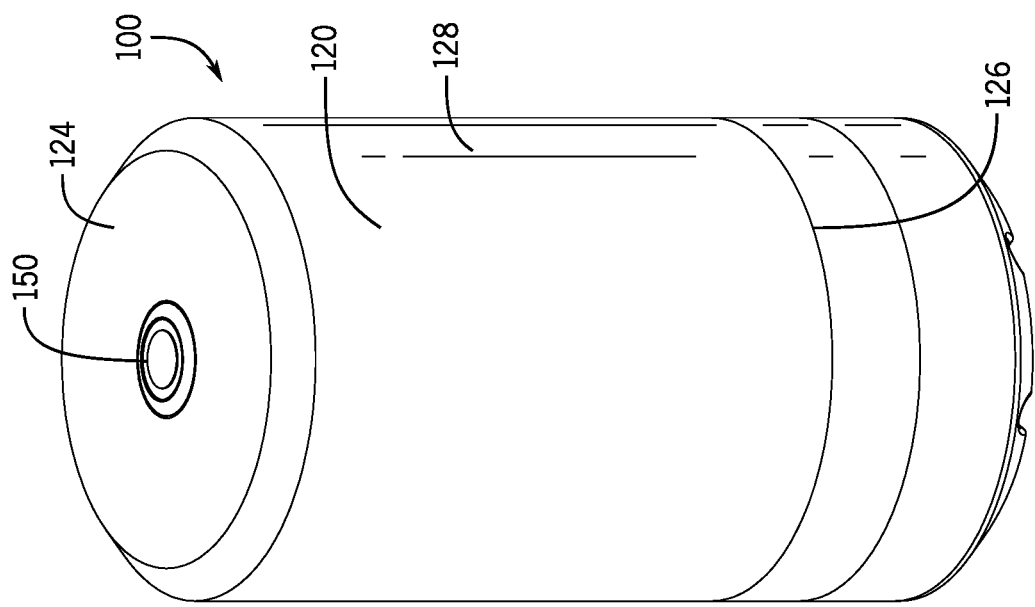
FIG. 2 depicts a bottom isometric view of a grinder and extraction device of FIG. 1.
Figure 3:
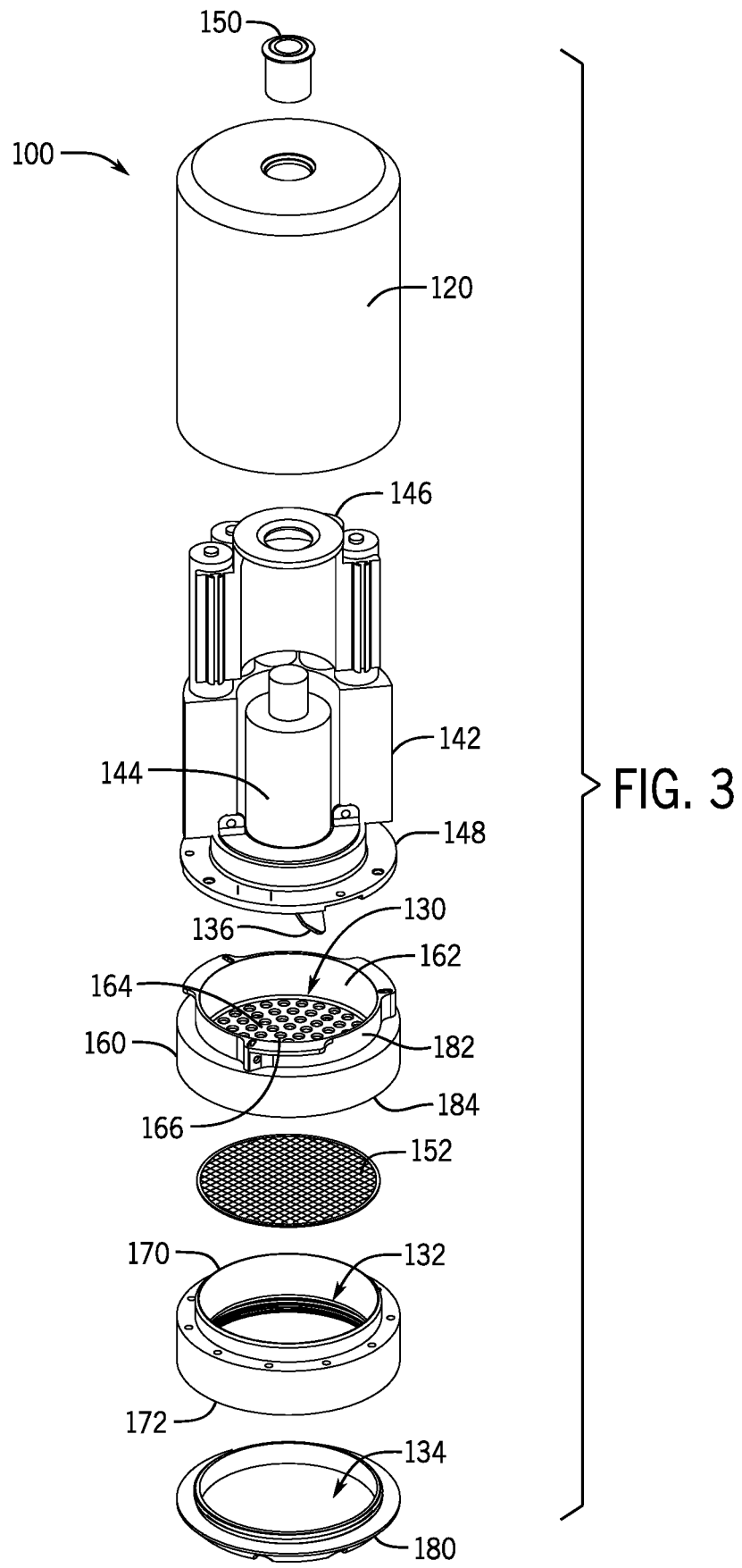

Embodiments of the present disclosure are directed to a grinder and extraction device 100, as seen in FIGS. 1-6. The grinder and extraction device 100 is designed and configured to simultaneously grind and collect natural substances, such as herbs, and extract resins. In a non-limiting example, devices designed in accordance with embodiments of the present disclosure can be used to grind cannabis, resulting in simultaneous products of ground cannabis and extracted kief.

The grinder and extraction device 100 of FIGS. 1-6 includes a housing 120 having a first end 124 and a second end 126 and defining a motor chamber 122 having an opening at the second end 126, a grinding chamber 130, and a collection chamber 132. The grinder and extraction device 100 further includes a motor 144 disposed within the motor chamber 122, and a blade 136 for grinding the substance, which is powered by the motor 144. The housing 120 with a motor 144 disposed therein defines the body portion 128 of the grinder and extraction device 100. A blade 136 extends outwardly from the body portion 128 and is housed within the grinding chamber 130. A first filter 164 separates the grinding chamber 130 from the collection chamber 132. A second filter 152 separates the collection chamber 132 from an optional extraction chamber 134.

Various example embodiments of the disclosure are discussed in detail below. While specific implementations are discussed, these specific illustrations are for illustration purposes only. A person skilled in the relevant art will recognize that other components and configurations may be used without parting from the spirit and scope of the disclosure. Thus, the following description and drawings are illustrative and are not to be construed as limiting.

Numerous specific details are described to provide a thorough understanding of the disclosure. However, in certain instances, well-known or conventional details are not described to avoid obscuring the description. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

*Cannabis* is a genus of an annual, dioecious, flowering herb in the family Cannabaceae. Cannabis plants produce a group of chemicals called cannabinoids, which generate mental and physical effects when consumed. Cannabinoids, terpenoids, and other compounds are secreted by glandular trichomes that occur most abundantly on the floral calyxes and bracts of female plants.

As a drug cannabis typically comes in the form of dried infructescences ("buds", "fruits", or "marijuana"), resin ("kief"), or various extracts or products derived from further processing, such as cannabis oils, hash, etc.

Kief is a collection of loose resin trichomes cannabis that accumulate by being sifted from cannabis infructescences with a mesh screen or sieve. Trichomes refer to the "hair", which are fine outgrowths or appendages on plants, algae, lichens, and certain protists. Kief contains a much higher concentration of tetrahydrocannabinol (THC) and other cannabinoids than that of the cannabis infructescences from which it is derived.

A grinder is a device designed to break cannabis bud into fine, evenly ground pieces. Previously designed grinder generally use sharp teeth that are designed to shred the dense buds. During the grinding process, the bud is ground into a ground substance of fine, evenly ground bits, and the kief tends to separate from the bud.

Figure 6:
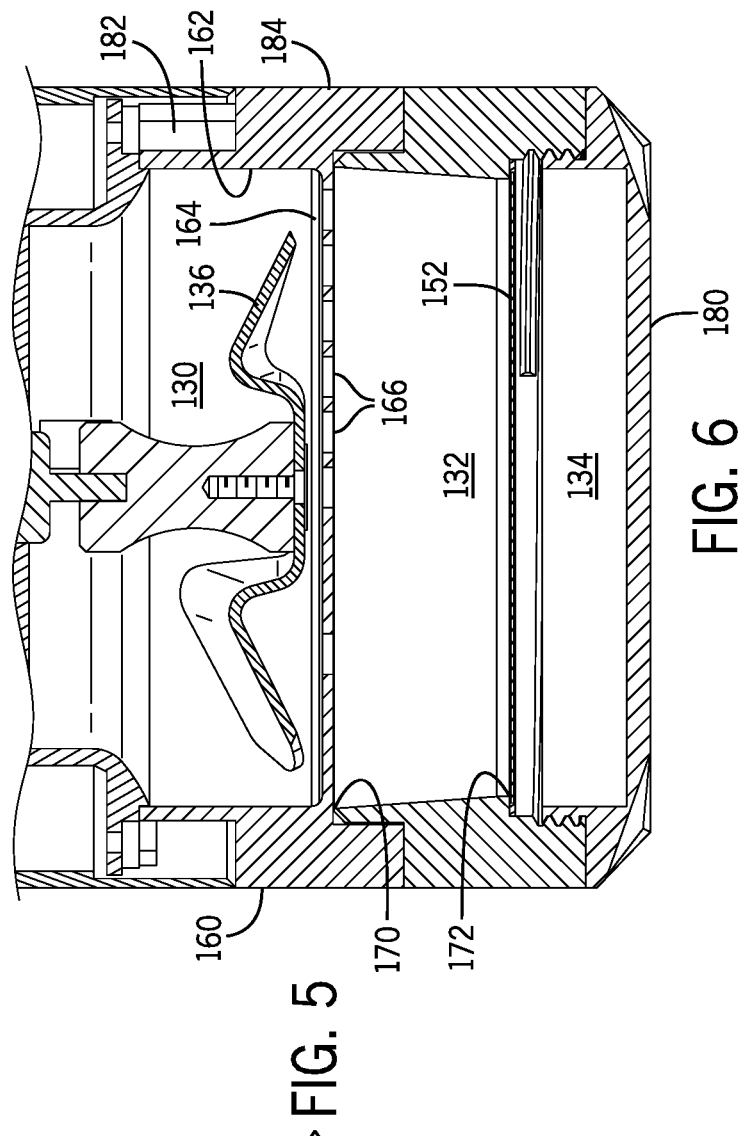
FIG. 6 depicts a cross-sectional view showing a blade disposed within the grinding chamber, and the first filter into the collection chamber, and the second filter into the extraction chamber of the grinder and extraction device of FIGS. 1 and 2.

As seen in the cross-sectional view of FIG. 6, the illustrated grinder and extraction device 100 includes three chambers, the grinding chamber 130, the collection chamber 132, and the extraction chamber 134, which all may be separated from each other for access and cleaning. The grinding and collection chambers 130 and 132 are separated by the first filter 164, which may be a wall with holes 166 extending therethrough. The collection and extraction chambers 132 and 134 are separated by second filter 152, which may be a sieve or a screen. In the first grinding chamber 130, bud is ground. In the second collection chamber 132, ground bud passes from the grinding chamber 130 through holes 166 and is collected. In the third extraction chamber 134, trichomes that fall off the weed during the grinding process pass through the second filter 152 and are collected. A three-chamber (grinding, collection, and extraction) configuration in the grinder and extraction device 100 of the present disclosure allows for collection of kief after an extended period of grinding.

Without a separate extraction chamber 134, the kief will simply collect along the walls of the grinding chamber 130 and the collection chamber 132. In some cases, the amount of kief collectable along the walls of the grinding chamber 130 and the collection chamber 132 may be a small amount, but enough to require that the grinding chamber 130 be regularly cleaned for improved grinding operation. Therefore, the extraction chamber 134 allows for collection of higher quantities of kief before the grinding chamber 130 requires cleaning.

Manual grinders (as opposed to electric grinders) tend to be more popular among cannabis users. While electric grinders can grind bud more quickly and with less effort, electric grinders tent to pulverize the bud into powder, which may not be an ideal consistency for optimizing airflow.

Grinder and extraction devices 100 designed in accordance with embodiments of the present disclosure include an electric grinding motor (e.g., the motor 144) designed and configured for improved grinding of the bud without pulverizing the bud into powder. In one embodiment of the present disclosure, the device 100 includes a battery pack 146 for battery power. The battery pack 146 may be a rechargeable battery pack. In other embodiments, the device 100 may include an external power supply.

The battery pack 146 in the illustrated embodiment powers a motor 144 of a motor section 142. In one embodiment, the motor 144 is a high torque motor, high RPM motor for efficient grinding and extraction of the substance being ground by grinder and extraction device 100. The motor 144 may be activated by a motor activation device 150, shown as a button in FIGS. 3 and 4. Other suitable motor activation devices are also within the scope of the present disclosure. The battery pack 140 and the motor section 142 are received within the housing 120.

Devices designed in accordance with embodiments of the present disclosure may include a blade 136 for grinding (as opposed to teeth for grinding). As described in greater detail below, suitable blades 136 may include flat blades, knife blades, curved knife blades, propeller blades, etc.

In the illustrated embodiment, the grinding chamber 130 extends from an end 148 of the motor section 142, to which the blade 136 is attached, and defines a housing for surrounding the blade 136.

The grinding chamber 130 is removably attachable to the end 148 of the motor section 142 by any suitable attachment mechanism. In some embodiments, the grinding chamber 130 cannot be removed when the motor 144 is being powered. When removed, the grinding chamber 130 and/or the blade 136 can be cleaned.

The grinding chamber housing 160 includes a surrounding wall 162 having a first end 182 configured for coupling to the end 148 of the motor section 142 and a second end 184 configured for coupling with the collection chamber 134. In the illustrated embodiment, the second end 184 of the grinding chamber housing 160 includes a first filter 164 having holes 166 disposed therein for the passage of ground bud. In one embodiment of the present disclosure, the holes 166 may be sized to be in the range of about 5 to about 6 mm.

In the illustrated embodiment, the first end 170 of the collection chamber 132 is coupled to the second end 184 of the grinding chamber housing 160 and defines a chamber within which ground bud may be collected and stored. In one embodiment, a first end 170 of the collection chamber 132 may be releasably coupled to the second end 184 of the grinding chamber housing 160. Access to the collection chamber 132 may be obtained by removing the collection chamber 132 from the grinding chamber housing 160 to remove the ground bud from the collection chamber 132.

During the grinding process, and in the case of grinding marijuana, the second filter 152 disposed between the collection chamber 132 and the extraction chamber 134 can be used to separate the ground bud collected in collection chamber 132 from the extracted kief collected in extraction chamber 134. In one suitable embodiment, the second filter 152 may be a screen made from a stainless steel or other suitable material for cleanability and to prevent sticking of the kief. In one embodiment, the screen may have a mesh size in the range of about 2 to about 3 mm. Access to the extraction chamber 134 may be obtained by removing the lid 180, which is coupled to the second end of the collection chamber and which defines the extraction chamber 134, to remove extracted kief from the extraction chamber 134.

In use, the grinding chamber housing 160 can be removed from the body portion 128 of the device 100, a substance to be ground is disposed within the grinding chamber 130, and the body portion 128 is re-attached to the grinding chamber 130 (see FIG. 1). A user activates the motor 144 and the blade 136 for grinding by pressing the motor activation device 150. After a suitable grinding period, the motor 144 and blade 136 are deactivated. The collection chamber 132 can be accessed to obtain ground bud that moves through first filter 164 from the grinding chamber 130 to the collection chamber 132 (see FIG. 6). In addition, the extraction chamber 134 can be accessed by removing lid 180 to obtain extracts, such as kief, that move through second filter 152 from the collection chamber 132 to the extraction chamber 134 (see FIG. 6).

To prevent pulverizing of the bud into powder, the blade 136 is specifically designed to slap and fan the bud, as opposed to cutting the bud. During the slapping and fanning process, ground bud accumulates in the collection chamber 132 and extracted kief is collected in the extraction chamber 134. As described in greater detail below, the blade 136 can be designed for processing a particular product. For example, the pitch of the blade, the number of blades, and the distance the blade resides from the walls of the first grinding chamber 130 are all variables that can be optimized in the grinding chamber design.

Figure 5:
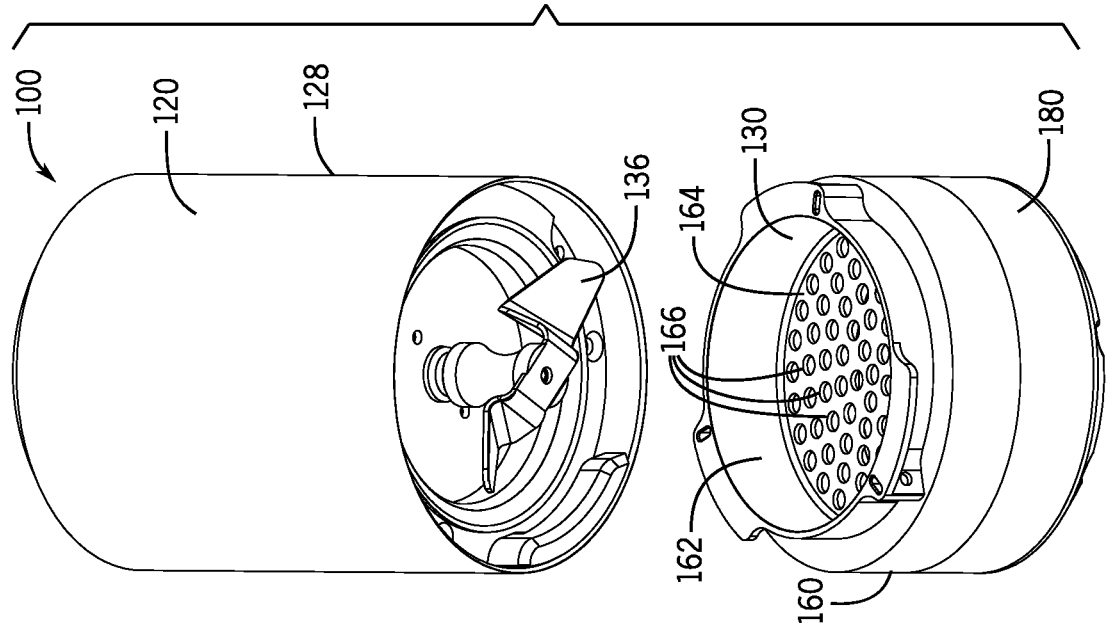
FIG. 5 depicts an isometric view showing the opening of the grinding chamber of the grinder and extraction device of FIGS. 1 and 2.

In the illustrated embodiment of FIGS. 5 and 6, the blade 136 is a knife blade. In the illustrated embodiment of FIG. 7, the blade 236 is shown as a propeller blade. Other blades 136 are also within the scope of the present disclosure. The blade 136 and the first filter 164 of the grinding chamber 130 work together in concert to separate kief from ground bud. In that regard, the blade 136 is designed to fan the product toward the first filter 164 of the grinding chamber 130.

The spacing between the blade 136 and the first filter 164 of the grinding chamber 130 is designed such that the blade pushes or shovels the separated kief through the holes 166 in the first filter 164 of the grinding chamber 130. In one embodiment, the bottom of the blade 136 may be spaced less than 0.5 inches or less than 0.25 inches from the top surface of the first filter 164 of the grinding chamber 130. In addition, the blade 136 may be spaced less than 0.5 inches or less than 0.25 inches from the inner surface of the surrounding wall 162 of the grinding chamber 130.

Such action between the blade 136 and the first filter 164 of the grinding chamber 130 increases kief collection by more readily separating the kief from the ground bud. As a result, kief that is normally collected over days or weeks can be collected on demand.

In addition, the finish of the blade 136 and the grinding chamber 130 may be designed to prevent the ground bud and kief from sticking to the surfaces of the blade 136 or the grinding chamber 130. Likewise, the blade 136 may be designed and configured to resist heating up when in use.

In one embodiment of the present disclosure, the blade 136 is interchangeable. For example, the user can change the blade 136 depending on the grind product they would like to produce.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

Language such as "top", "bottom", "upper", "lower", "vertical", "horizontal", "lateral", etc., in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification. Unless otherwise defined, technical and scientific terms used herein have the meaning as commonly understood by one of ordinary skill in the art to which this disclosure pertains. In the case of conflict, the present document, including definitions will control.

Note that titles or subtitles may be used in the examples for convenience of a reader, which in no way should limit the scope of the disclosure.

While illustrative embodiments have been illustrated and described, it will be appreciated that various changes can be made therein without departing from the spirit and scope of the present disclosure.

What is claimed is:

1. A grinding and extraction device, comprising:
a housing including a motor chamber, a grinding chamber, a collection chamber, and an extraction chamber that are arranged in series, wherein the grinding chamber is defined at least in part by a first inner wall that extends between a first end and a second end, wherein the collection chamber is positioned between the grinding chamber and the extraction chamber and the collection chamber is defined at least in part by a second inner wall extending between a third end adjacent the grinding chamber and a fourth end adjacent the extraction chamber, wherein the second inner wall is tapered such that the collection chamber is wider at the third end than the fourth end, wherein the extraction chamber is defined at least in part by a third inner wall and a lid, wherein the grinding chamber, collection chamber, and the extraction chamber each define an internal volume, wherein the internal volume of the extraction chamber is less than the internal volume the grinding chamber, and wherein the internal volume of the extraction chamber is less than the internal volume of the collection chamber;
a motor disposed within the motor chamber;
a blade for grinding powered by the motor, wherein the blade is a propeller blade including a hub and at least three blade portions coupled to, and extending out of, the hub, wherein each of a blade portion of the at least three blade portions defines a leading edge, a trailing edge coupling to the leading edge at a tip, and a pitch, and wherein the pitch varies across the entire length of each of the blade portion;
a first filter separating the grinding chamber from the collection chamber, wherein the tip of each of the blade portion is disposed within the grinding chamber within 0.5 inches of the first filter and within 0.5 inches of the first inner wall of the grinding chamber, wherein, for each of the blade portion, the trailing edge is positioned closer to the first filter than the leading edge, wherein the hub is spaced from the first filer such that a gap exists between the hub and the first filter, and wherein each of the blade portion is configured to push material through the first filter; and
a second filter separating the collection chamber and the extraction chamber, wherein the second filter defines a diameter, and wherein the diameter of the second filter is greater than a diameter of the second inner wall at the fourth end.

2. The device of claim 1, wherein the motor is battery powered.

3. The device of claim 1, wherein the motor is a high-torque motor.

4. The device of claim 1, wherein the first filter has a hole size in the range of 5 to 6 mm.

5. The device of claim 1, wherein the second filter has a hole size in the range of 2 to 3 mm.

6. The device of claim 1, wherein each of the blade portion is disposed within the grinding chamber within 0.25 inches of the first filter.

7. The device of claim 1, further including batteries, wherein the batteries are rechargeable.

8. A method of grinding and extracting a resin from a natural substance, the method comprising:
obtaining a device, wherein the device includes:
a housing including a grinding chamber, a collection chamber, and an extraction chamber arranged that are in series, wherein the grinding chamber is defined at least in part by a first inner wall that extends between a first end and a second end, wherein the collection chamber is positioned between the grinding chamber and the extraction chamber and the collection chamber is defined at least in part by a second inner wall extending between a third end adjacent the grinding chamber and a fourth end adjacent the extraction chamber, wherein the second inner wall is tapered such that the collection chamber is wider at the third end than the fourth end, wherein the extraction chamber is defined at least in part by a third inner wall and a lid, wherein the grinding chamber, collection chamber, an extraction chamber each define an internal volume, wherein the internal volume of the extraction chamber is less than the internal volume the grinding chamber, and wherein the internal volume of the extraction chamber is less than the internal volume of the collection chamber;
a blade for interacting with the natural substance, wherein the blade is a propeller blade including a hub and at least three blade portions coupled to, and extending out of, the hub, wherein each of a blade portion of the at least three blade portions defines a leading edge, a trailing edge coupling to the leading edge at a tip, and a pitch, and wherein the pitch varies across the entire length of each of the blade portion;
a first filter separating the grinding chamber from the collection chamber, wherein the tip of each of the blade portion is disposed within the grinding chamber within 0.5 inches of the first filter, and within 0.5 inches of the first inner wall of the grinding chamber, wherein, for each of the blade portion, the trailing edge is positioned closer to the first filter than the leading edge, wherein the hub is spaced from the first filer such that a gap exists between the hub and the first filter; and
a second filter separating the collection chamber and the extraction chamber, wherein the second filter defines a diameter, and wherein the diameter of the second filter is greater than a diameter of the second inner wall at the fourth end;
grinding the natural substance in the grinding chamber to a ground substance;
pushing the ground substance with the blade through the first filter;
filtering the ground substance of a predetermined particle size into the collection chamber; and
filtering the resin from the ground substance of a predetermined particle size into the extraction chamber, wherein the filtered resin has a predetermined particle size.

9. The method of claim 8, wherein the device is battery powered.

10. The method of claim 8, wherein the wherein the device includes a high-torque motor.

11. The method of claim 8, wherein the first filter has a hole size in the range of 5 to 6 mm.

12. The method of claim 8, wherein the second filter has a hole size in the range of 2 to 3 mm.

13. The method of claim 8, wherein each of the blade portion disposed within the grinding chamber within 0.25 inches of the first filter.

14. The method of claim 8, wherein grinding the natural substance in the grinding chamber includes slapping the natural substance with the blade.

15. The method of claim 8, wherein pushing the ground substance with the blade includes fanning the ground substance towards the first filter.

* * * * *

UNITED STATES PATENT AND TRADEMARK OFFICE
CERTIFICATE OF CORRECTION

PATENT NO. : 12,226,053 B1  
APPLICATION NO. : 17/959185  
DATED : February 18, 2025  
INVENTOR(S) : Cory A. Horton, Sr.

Page 1 of 1

It is certified that error appears in the above-identified patent and that said Letters Patent is hereby corrected as shown below:

In the Claims

- In Claim 1, Column 7, Line 35, insert -- of -- between "internal volume" and "the grinding";

- In Claim 8, Column 8, Line 15-16, delete "arranged that are in series" and insert -- that are arranged in series --;

- In Claim 8, Column 8, Line 28, delete "an" between "chamber," and "extraction" and insert -- and --;

- In Claim 8, Column 8, Line 31, insert -- of -- between "internal volume" and "the grinding";

- In Claim 8, Column 8, Line 49, delete "filer" between "the first" and "such that" and insert -- filter --;

- In Claim 10, Column 9, Line 1, delete "wherein the" between "claim 8," and "wherein the".

Signed and Sealed this  
Second Day of September, 2025

Coke Morgan Stewart  
*Acting Director of the United States Patent and Trademark Office*